United States Patent [19]
Fisher

[11] 3,751,574
[45] Aug. 7, 1973

[54] BALLAST CANNISTER CONSTRUCTION
[75] Inventor: Clarence E. Fisher, Roselle, Ill.
[73] Assignee: Advance Transformer Co., Chicago, Ill.
[22] Filed: June 23, 1972
[21] Appl. No.: 265,597

[52] U.S. Cl. .......................... 174/52 R, 174/DIG. 2
[51] Int. Cl. ................................................ H05k 5/04
[58] Field of Search ..................... 174/DIG. 2, 52 R; 220/3.92, 3.94, 4 R

[56] References Cited
UNITED STATES PATENTS
| | | | |
|---|---|---|---|
| 2,779,812 | 1/1957 | Rowe | 174/DIG. 2 |
| 2,779,496 | 1/1957 | Henderson | 174/DIG. 2 |
| 3,049,579 | 8/1962 | Sulzer | 174/DIG. 2 |
| 3,299,200 | 1/1967 | Sulzer | 174/DIG. 2 |
| 1,072,009 | 9/1913 | Keefe | 220/3.94 |
| 3,386,606 | 6/1968 | Pastrick | 220/3.94 |

Primary Examiner—Bernard A. Gilheany
Assistant Examiner—D. A. Tone
Attorney—I. Irving Silverman et al.

[57] ABSTRACT

A ballast canister has its end wall provided with integral ears that are formed during fabrication of the end wall and provide confining guides for the flanges of a junction box attached to the canister.

6 Claims, 4 Drawing Figures

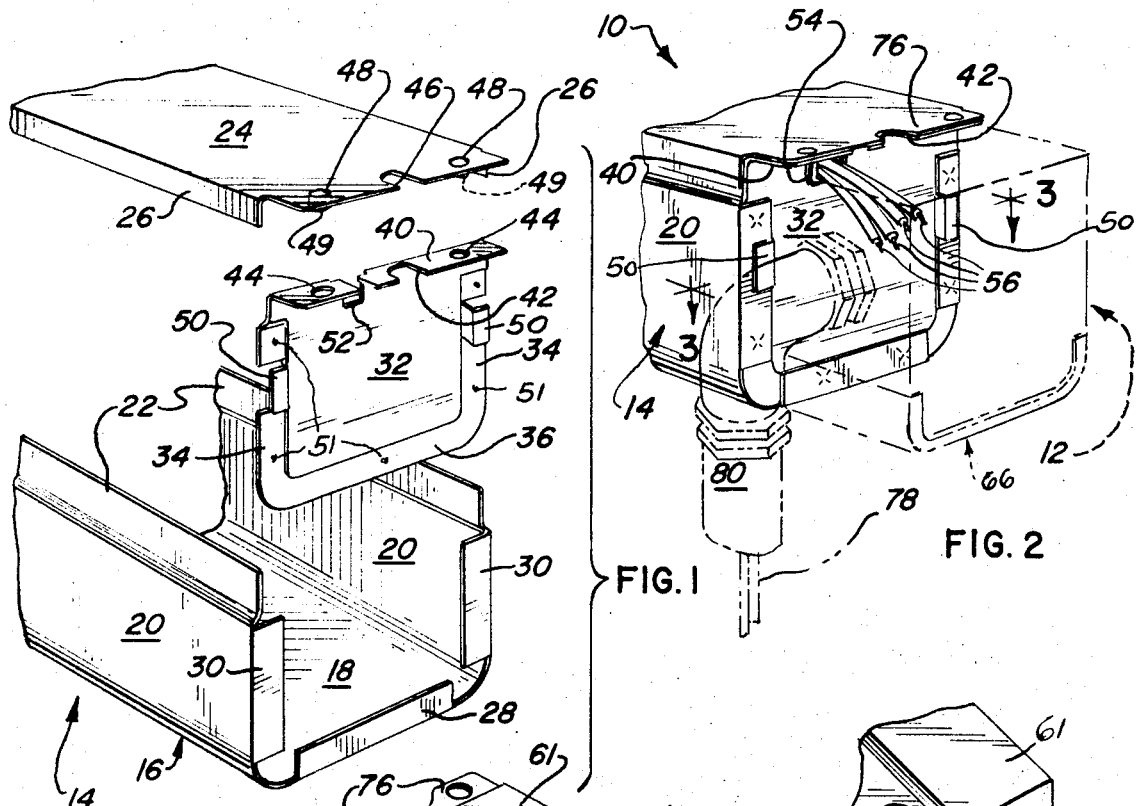
FIG. 1
FIG. 2
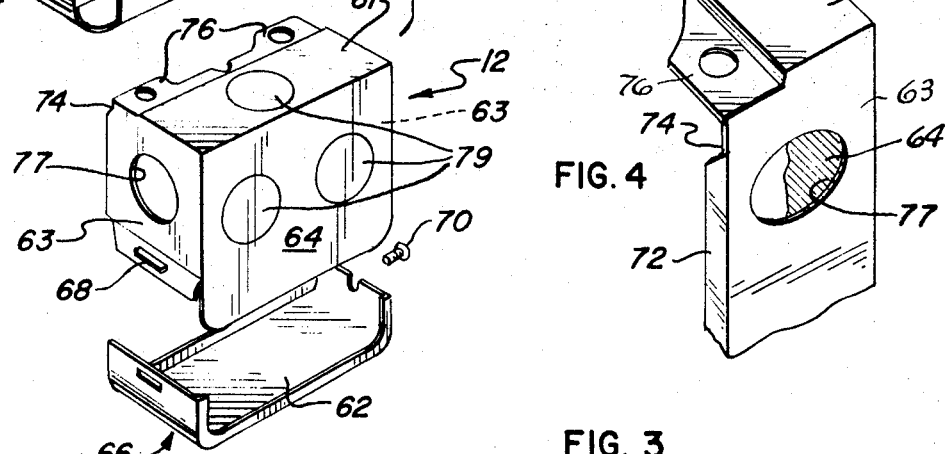
FIG. 4
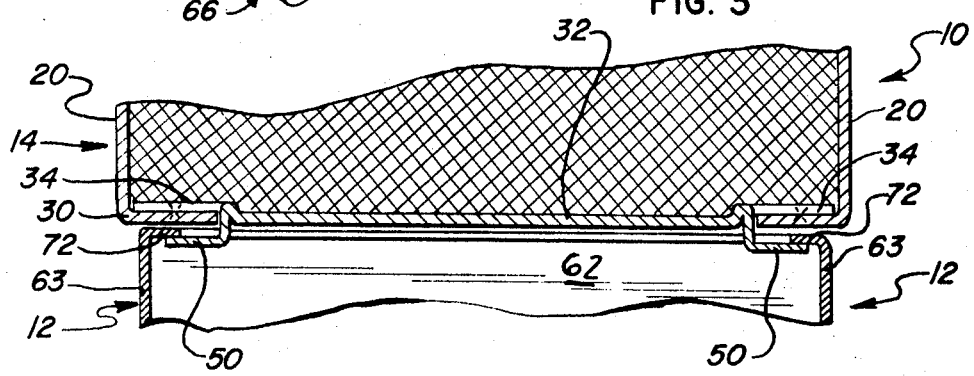
FIG. 3

BALLAST CANNISTER CONSTRUCTION

BACKGROUND OF THE INVENTION

The invention is concerned with the construction of a ballast canister which is adapted to have the open face of a junction box secured to one end thereof, the leads emerging from the canister entering the junction box and there being connected to external circuit wires which enter the junction box through knockouts in walls of the junction box. The external circuit wires are confined outside of the junction box and led thereto by way of BX cable or thin-wall conduit of conventional construction.

The particular combination is especially used in installations for ballasts which comprise open fixtures, that is fixtures which do not have confining housings, although the invention is not necessarily so limited. With a confining housing, as in the case of most fluorescent ballasts, the external circuit wires are led into the interior of the confining housing through the walls of the housing of the fixture and connected to the leads emerging from the ballast within the housing. These connections are of conventional type, that is, with so-called electrical nuts or other connectors. The housing itself, an integral part of the fixture, has knockouts to receive fittings for coupling the thin-wall conduit or BX cable to the fixture which carries the external circuit wires to the fixture.

Many fixtures are of the open type, especially fixtures which are used for mercury vapor lamps and which carry mercury vapor lamp ballasts contained in the familiar and well-known "black box" canisters that are universally used for fluorescent lamp ballasts. Such fixtures do not have enclosed housings but instead comprise open flat plates from which the lamp holders are supported. The ballast in its canister is mounted directly to the plate by the use of mounting legs which are integral with the cover member of the canister.

For such arrangements it is essential that there be a junction box enclosing the connections between the external circuit wires and the leads which normally emerge from one end of the canister and so it has become common to secure a junction box to such end. The junction box is available commercially and is usually a small open-faced box with a removable cover, the box being secured to the end of the canister from which the wire leads emerge and also being attached to the mounting plate of the fixture. Its configuration is identical in cross section to that of the canister so that it forms a small hollow extension of the canister. The cover member is held in place by a tongue and a small screw, and when removed, gives access to the interior of the junction box, also enabling the junction box to be screwed to the mounting plate with the same screws used to fasten the said end of the canister to the plate.

The open face of the junction box normally has an inturned flanged edge with a notch at the bottom thereof on opposite sides of the said open face. Conventionally a flat strip of metal with its ends bent away from the end wall of the canister is welded to the canister end wall. These free ends form guides for the junction box which can be engaged over the free ends because of the notches and slid along the end wall until the front portion of the bottom wall of the junction box overlies the mounting legs of the cover member of the canister. The screws securing the mounting legs having previously been removed, they are now replaced, securing the ballast and the junction box to the mounting plate.

To make the discussion more understandable, conventional "black box" ballasts for fluorescent lamps and in the particular instance herein described for mercury vapor lamps as well, comprise transformers, chokes, condensers and perhaps other electrical components potted in potting compound (asphalt and silica, usually) in elongate brick-shaped canisters made out of sheet metal. In production, a canister body is formed of an open-ended integral troughlike sheet metal structure having an elongate bottom rectangular wall and opposite elongate side walls, the ends of the troughlike structure having inturned tabs. End walls are provided having substantially the same configuration as the cross section of the troughlike structure and also having cooperating marginal flanges as well as leg-forming flanges. The end walls are spot-welded to the troughlike structure through the engaged tabs and flanges thus closing off the ends of the troughlike structure and forming an open-topped elongate rectangular cross-section box. One end wall has a hole or recess for reception of a grommet through which lead wires will emerge and both end walls have the leg flanges disposed on their edges located at the open top of the box. The entire box is given a coating of enamel or the like of black color and having a durable finish.

In this condition, the box passes down the production line, the electrical components, potting compounds, insulation and the like are laid into the same, the leads gathered in a group and placed in the grommet so as to emerge from said one end wall, and a relatively flat prefinished cover member is secured over the open top. The cover member normally has side flanges engaging outside of the elongate sides of the box and cooperating mounting leg-forming flanges aligned with those of the end walls. Short grommet formations on the flanges of the cover member engage in aligned holes of the leg-forming flanges of the end walls and are swagged to securely lock the cover member onto the box, the grommet formations and holes and/or slots providing passageways for securement of screws to the mounting plate of a fixture to hold the ballast in place.

The invention herein is concerned with the manufacture of the canister for the ballast in such a manner as to eliminate the need for mounting an additional strip of metal to an end plate in order to enable a junction box to be secured thereto. This is done, as will be seen, by forming ears on opposite sides of the end wall out of the cooperating flanges, this being the wall that has the grommet. This can be done easily while stamping the end wall and hence there are no added steps to achieve the securement of the strip; the resulting structure is stronger; the amount of material used is less; and the modification of the stamping die for said end wall is negligible cost-wise and effort-wise.

SUMMARY OF THE INVENTION

A ballast which is adapted to have a junction box mounted to an end wall of the ballast and with the ballast secured to a mounting plate of a fixture has a canister which is formed of sheet metal having an end wall provided with integral ears adapted to engage with and guide flanges formed on the junction box while the junction box is being mounted to the ballast and plate. The said end wall is formed by stamping and the ears are shear-formed prior to securing the end wall to the remainder of the canister during the fabrication of said canister. The canister includes a troughlike body with inturned tabs and the said end wall has cooperating marginal flanges, the ears being shear-formed from said cooperating flanges and being positioned so as not to interfere with the spot-welding of the flanges and tabs together while securing the said end wall to said body.

BRIEF DESCRIPTION OF THE DRAWING

FIG. 1 is an exploded fragmentary view of the end of a canister for containing a ballast and a junction box, the canister being constructed in accordance with the invention;

FIG. 2 is a fragmentary view of the assembled ballast showing the location of the junction box relative thereto;

FIG. 3 is a fragmentary sectional view taken generally along the line 3—3 of FIG. 2 and in the indicated direction; and FIG. 4 is a fragmentary perspective view of a corner of the junction box to show details thereof.

DESCRIPTION OF THE PREFERRED EMBODIMENT

The invention is characterized by the provision of a ballast comprising a canister which permits the securement of a sheet metal junction box to an end wall of the canister and to the mounting plate of an open fixture along with the ballast.

The reference character 10 is used generally to designate the ballast of the invention and the reference character 12 is used generally to designate the junction box which is illustrated, the latter being conventional in construction. As a matter of fact, but for the end wall of the canister of the ballast 10, the same may be considered conventional also.

The canister 14 of the ballast 10 comprises an elongate troughlike body 16 of sheet metal having an elongate bottom 18 and elongate sides 20. The upper edge of each side 20 is embossed as at 22 to enable the securement of the elongate cover member 24 thereto, the side edges of the cover member 24 being flanged at 26 to engage the embossed edges 22. The bottom 18 has inturned tab 28 and the sides 20 have inturned tabs 30, the tabs being disposed at the ends of the body 16. An end wall 32 is stamped of sheet metal and its configuration as seen is the same as the cross section of the body 16. Around its sides and bottom it has marginal, slightly upset or embossed areas forming what are termed flanges 34 and 36, these flanges overlying the inside surfaces of the tabs 28 and 30 when end wall 32 is positioned as shown in FIG. 2 so that the flanges and tabs can be respectively spot-welded together to close the troughlike body 16 and form the box portion of the canister 14. A substantially similar end wall is secured in the same manner as described to the opposite end of the canister 14 which cannot be seen in the views.

In addition to the flanges 34 and 36, the end wall 32 has outwardly bent leg-forming flanges 40 along its upper edge, providing the slot 42 and the openings 44 which align with the slot 46 and the openings 48, respectively of the cover member 24 when the cover member is in place on the box portion of the canister. In this position, the grommet formations 49 on the cover member 24 surrounding and depending from its openings 48 engage in the openings 44 and can be swagged in place to lock the cover member 24 in place. Obviously, this is done only after the entire ballast 10 has been assembled.

As described thus far, the ballast is conventional. According to the invention, ears 50 are shear-formed out of the flanges 34 during the stamping of the end wall 32. This is easily done by suitable minor modification of the dies used to stamp said end wall 32. The location of the ears 50 is such that there is no interference with the process of spot-welding the end wall 32 to the body 16. Welding areas are indicated by small pimples 51 formed in flanges 34 and 36 during stamping of end wall 32. The ears 50 are parallel with and spaced from the plane defined by the end wall 32 and they extend outwardly from the end wall, that is, right and left as viewed in the drawing. The end wall 32 also has a suitable recess 52 formed along its upper edge that is provided with an insulating grommet 54, the internal leads 56 from the interior of the ballast 10 emerging through the recess 52 and grommet 54. The spacing of the ears 50 from flanges 34 is sufficient to accommodate the tabs 30 (since the flanges 34 are welded behind the tabs) and yet leave space so that the junction box 12 may be secured to said ears 50.

The junction box 12 is in the form of an open box as shown, there being top, bottom, side and end walls. These are designated respectively 61, 62, 63 and 64. The open face can be seen in FIG. 4. There is a cover member 66 held in place by a tongue 68 and a screw 70 which can be removed as shown to give access to the interior of the junction box 12. This is shown on the bottom, but the use of the words "top," "bottom," "sides," etc. are intended only to be relative to the drawing since the ballast 10 and junction box 12 may be mounted in almost any desired disposition.

There is a flange 72 alongside the edge of each of the side walls 63 which discontinues at 74 to form notches. To mount the junction box 12, one removes the cover member 66, slips the box onto the ears 50 by way of the notches 74 so that the flanges 72 are confined by the ears, and slides the junction box 12 all the way to the leg formations resulting from the attachment of the end of the cover member 24 to the flanges 40 of the end wall 32. As viewed in the drawing, the junction box 12 would be slipped onto the ears 50 from the bottom thereof.

With the junction box 12 pushed home, the mounting screws may be engaged through the openings and/or slot in the leg formations 76 in the top wall 61 of the junction box 12 and the openings and/or slot of the legs of the ballast 10 into the mounting plate (not shown). Recall that the cover member 66 is removed. The leads 56 from the ballast 10 may now be connected to external circuit wires 78 brought into the junction box 12 by way of conduit or BX cable 80 coupled to any of the knockouts, several of which are shown open at 77 and not punched out yet at 79. Thereafter the cover member 66 is replaced, confining all of the connections.

It is pointed out that inasmuch as the ears 50 are shear-formed out of the flanges 34, when the tabs 30 are in place substantially covering the said flanges 34, they also block the notches from which the ears 50 are pressed. Thus, potting compound is not likely to run out of the canister 14 while it is being filled.

What is desired to secure by Letters Patent of the United States is:

1. A canister construction for a ballast or the like comprising a sheet metal box formed of an elongate troughlike member having inturned tabs at one end thereof, a planar end wall having marginal flanges in welded engagement with the tabs closing said end of the troughlike member and there being integral ears shear-formed from said flanges on opposite sides of said end wall, the ears extending outwardly sidewise of said end wall and lying in a plane spaced outwardly endwise of said end wall to enable securement of a junction box to said ballast.

2. The canister construction as claimed in claim 1 in which the welded engagement is effected with the flanges on the inside of the tabs and the ears located on the outside of the tabs.

3. The canister construction as claimed in claim 1 in which the end wall has means for pulling leads through said end wall from said ballast.

4. A ballast of elongate bricklike configuration and including a sheet metal canister having a planar end wall with leads emerging from said end wall, means for securing an open face junction box having flanges along said open face to said end wall and comprising a pair of ears integral with and formed as a part of said end wall, the ears being disposed adjacent opposite side edges of said end wall and lying in a plane spaced from said end wall and arranged to confine and guide the junction box flanges in a sliding movement for securing said box to said end wall with the said open face engaged against said end wall.

5. The ballast as claimed in claim 4 in which the junction box is of a type having the flanges inturned and the ears extend outwardly sidewise of said end wall.

6. Method of fabricating a canister comprising forming a troughlike body member with open ends and inturned tabs at one end, stamping a conforming end wall with marginal flanges and ears shear-formed from said flanges and spot welding the flanges and tabs together to close off said end with the tabs disposed between said flanges and ears and the ears on the outside of the thus formed canister end.

* * * * *